United States Patent
Guerra et al.

(10) Patent No.: US 12,524,282 B2
(45) Date of Patent: Jan. 13, 2026

(54) NOTIFICATION DELAY AND AUTO-DISMISS FUNCTIONALITY

(71) Applicant: Microsoft Technology Licensing, LLC, Redmond, WA (US)

(72) Inventors: Taylor Alexis Guerra, Seattle, WA (US); Diane M. Shambaugh, Seattle, WA (US); Alyssa N. P. Ricken, Seattle, WA (US); Hariharan Ragunathan, Woodinville, WA (US); Kyle Matthew Miller, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/854,816

(22) Filed: Jun. 30, 2022

(65) Prior Publication Data
US 2024/0004727 A1 Jan. 4, 2024

(51) Int. Cl.
*G06F 9/54* (2006.01)
*G06F 9/451* (2018.01)

(52) U.S. Cl.
CPC .............. *G06F 9/542* (2013.01); *G06F 9/451* (2018.02)

(58) Field of Classification Search
CPC ................................. G06F 9/542; G06F 9/451
See application file for complete search history.

(56) References Cited

U.S. PATENT DOCUMENTS

| | | | | |
|---|---|---|---|---|
| 2006/0176271 A1* | 8/2006 | Polivy | ................... | G06F 1/1613 345/156 |
| 2006/0205518 A1* | 9/2006 | Malabuyo | ............... | A63F 13/10 463/43 |
| 2007/0030128 A1* | 2/2007 | Hills | ...................... | A63B 71/06 340/323 R |
| 2008/0085728 A1* | 4/2008 | Reding | ............... | H04W 12/122 455/466 |
| 2008/0320394 A1* | 12/2008 | Womack | .................. | G09B 7/02 715/730 |
| 2009/0089399 A1* | 4/2009 | Beck | .................... | H04L 65/1069 709/218 |
| 2010/0138858 A1* | 6/2010 | Velazquez | ............ | H04N 21/435 725/33 |
| 2012/0166268 A1* | 6/2012 | Griffiths | ............. | G06Q 30/0222 705/14.23 |

(Continued)

*Primary Examiner* — Tuan C Dao

(57) ABSTRACT

In examples, a notification is presented to a user of a computing device (e.g., based on identifying a trigger associated with a current context or as a result of receiving a push notification). The notification includes notification content and a dismiss user interface (UI) control, which indicates a status of an auto-dismiss timer associated with the notification. If user interaction associated with the notification is identified, the auto-dismiss timer may be paused. The user may actuate the notification to perform an associated action or may actuate the dismiss UI control to manually dismiss the notification (e.g., prior to expiration of the auto-dismiss timer). The notification may further include a snooze UI control, which, when actuated, may snooze the notification and/or future notifications. Thus, such aspects may offer an improved and consistent user experience for notifications associated with an application, a group of applications, or an operating system, among other examples.

20 Claims, 15 Drawing Sheets

(56) References Cited

U.S. PATENT DOCUMENTS

| | | | |
|---|---|---|---|
| 2017/0063772 A1* | 3/2017 | Bapat | G06Q 50/01 |
| 2017/0134474 A1* | 5/2017 | Gao | H04L 67/62 |
| 2017/0346851 A1* | 11/2017 | Drake | H04L 9/0838 |
| 2018/0095635 A1* | 4/2018 | Valdivia | G02B 27/0093 |
| 2018/0097764 A1* | 4/2018 | Lutsenko | H04L 51/224 |
| 2022/0179665 A1* | 6/2022 | Rathod | G06F 9/451 |
| 2022/0326494 A1* | 10/2022 | Najmabadi | G02B 21/0036 |
| 2023/0040562 A1* | 2/2023 | Boivin | A61B 5/163 |

* cited by examiner

NOTIFICATION DELAY AND AUTO-DISMISS FUNCTIONALITY

BACKGROUND

Notifications may be overwhelming to a user of a computing device, as may be the case when they are unexpected, numerous, or otherwise distract the user from a task at hand. In these and other instances, the user may not engage with a notification when it is presented, such that the user may either forget about the notification or may have difficulty finding the notification at a later point in time. Further, repeated notifications may further exacerbate user frustration.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to notification delay and auto-dismiss functionality. In examples, a notification is presented to a user of a computing device (e.g., based on identifying a trigger associated with a current context of the computing device or as a result of receiving a push notification). The notification includes notification content and a dismiss user interface (UI) control, which indicates a status of an auto-dismiss timer associated with the notification. If user interaction associated with the notification is identified, the auto-dismiss timer may be paused. The user may actuate the notification to perform an associated action or may actuate the dismiss UI control to manually dismiss the notification (e.g., prior to expiration of the auto-dismiss timer). In examples, the notification further includes a snooze UI control, which, when actuated by the user, may snooze the notification and/or future notifications. Thus, such aspects may offer an improved and consistent user experience for various notifications associated with an application, a group of applications, or an operating system, among other examples.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
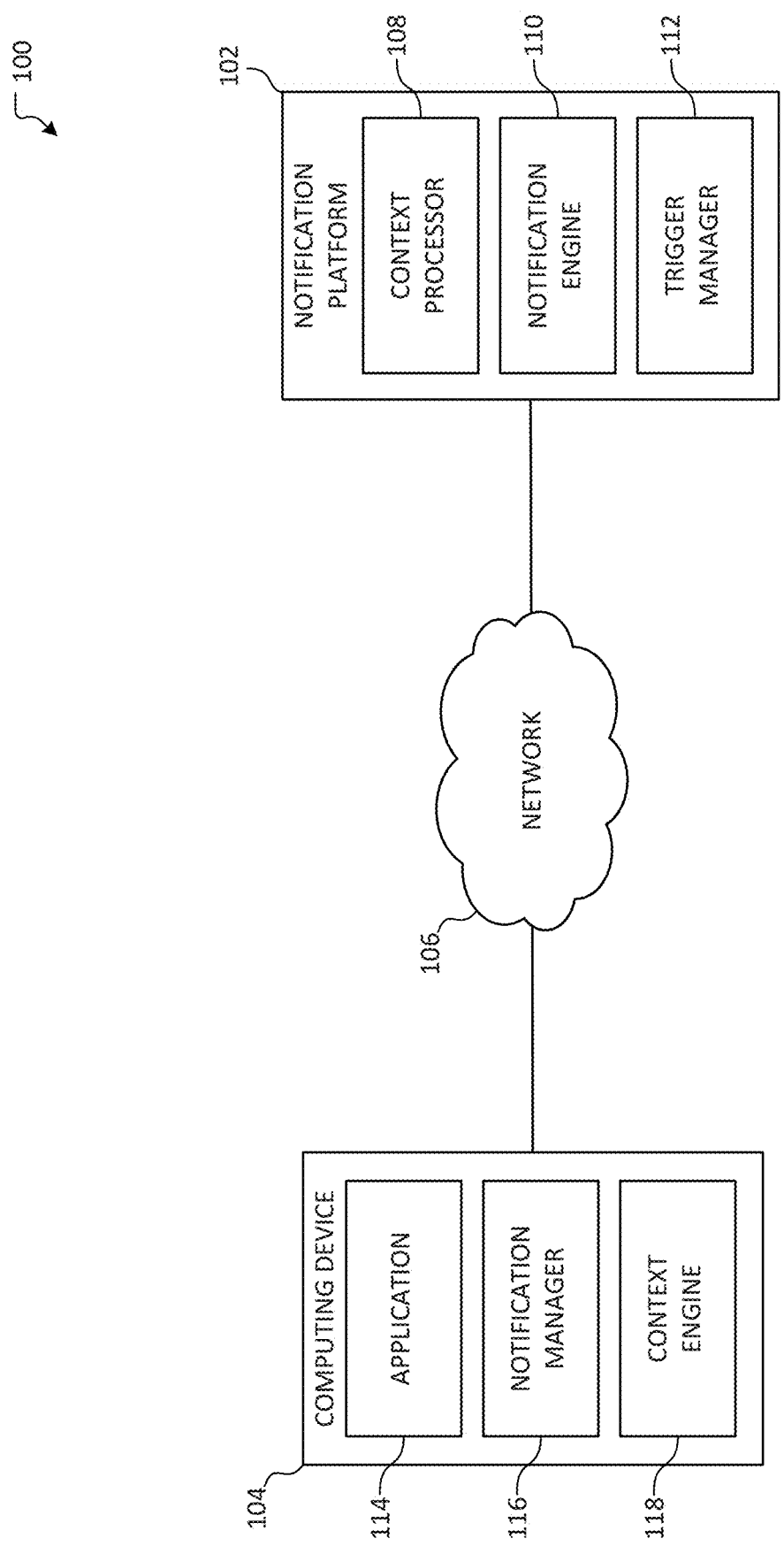
FIG. 1 illustrates an overview of an example system for notification delay and auto-dismiss functionality according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, notifications may be annoying or overwhelming to a user of a computing device, such that the user may ignore or dismiss such notifications. The user may eventually remember a certain notification that was of interest, but may be unable to retrieve the notification (since it was dismissed) or may have difficulty finding the notification (as a result of intervening notifications). Further, user frustration may be compounded in instances where a notification is unexpected or is deemed by the user to be unrelated to a task at hand.

Accordingly, aspects of the present disclosure relate to notification delay and auto-dismiss functionality. In examples, a notification may be presented to a user that includes an icon (e.g., associated with an application, a service, or a plugin), notification content, and/or a set of user interface (UI) controls. Example controls include, but are not limited to, a snooze UI control and a dismiss UI control. If the user does not interact with the notification (e.g., providing mouse, keyboard, touch, and/or physical control input), the notification may be automatically dismissed after a predetermined threshold (also referred to herein as an "auto-dismiss threshold"). In some examples, the dismissed notification may be added to a list of notifications (e.g., as may be accessed from a notification tray or notification center).

If, however, the user interacts with the notification, a timer associated with the auto-dismiss threshold may be paused (e.g., until the user stops interacting with the notification, at which point the time would resume and the notification would be dismissed), thereby enabling the user to view and/or continue interacting with the notification. In an example, the user may actuate the notification, thereby opening an application and/or performing one or more other actions associated with the notification.

In another example, the user may actuate the snooze UI control, such that the notification may be presented at a later date and/or time. In some instances, actuation of the snooze UI control may additionally or alternatively cause a snooze menu to be displayed, from which the user may select to snooze the notification and/or similar notifications (e.g., associated with the same application, extension, service, website, or other context) until the computing device is restarted and/or for a predetermined amount of time, among other examples. In some examples, actuation of the snooze UI control may enable a user to control a focus mode associated with the computing device (e.g., to enable a focus mode in which the notification and/or similar notifications may be suppressed). In instances where a user actuates the snooze UI control or selects an option from the snooze menu, an undo UI control may be presented, with which the user may revert an action that was performed as a result of the user's actuation of the snooze UI control or snooze menu. As a further example, the user may actuate the dismiss UI control, thereby causing the notification to be manually dismissed (e.g., sooner than the notification would otherwise have been dismissed via the auto-dismiss threshold).

In examples, the auto-dismiss threshold, available options within the snooze menu, and/or a default snooze action (e.g., which is performed as a result of actuating the snooze UI control) may be user-configurable, remotely configurable, and/or may vary based on an associated context. As used herein, a context includes, but is not limited to, content that is presented to a user (e.g., textual, video, audio, and/or graphical content of a website or of a document), a location from which the content was obtained (e.g., a web site uniform resource locator (URL), a document path, or a shared drive), a location at which the computing device is located (e.g., whether the computing device is in an office or at home), a behavior of a user (e.g., detected or repeated actuation of a set of UI and/or hardware controls), and/or session information associated with the user's computing device, among other examples.

A notification may be generated based on any of a variety of events. For example, a trigger may cause a notification to be generated for a given context, thereby causing a notification to be presented to the user that is temporally and/or contextually relevant to the user's current context. As an example, the trigger may have an associated a set of rules that are used to process the context to determine whether to generate the notification. As another example, processing a trigger may comprise extracting one or more entities (e.g., keywords, images, titles, and/or a URL or other path) associated with the user's context, which may be further processed to determine whether to generate the notification. In some instances, the processing associated with a trigger may further comprise generating the content of the notification (e.g., comprising text, an image, a video, and/or audio), which, in some examples, may be generated based at least in part on the context and/or extracted entities.

As an example, a context may be processed once a webpage has been loaded in a web browser application, such that a notification may be triggered based on the webpage accordingly. In some examples, the user's computing device may determine that the website is one for which a set of triggers are available, such that the computing device provides an indication of the user's context to a server computing device (as may be part of a notification platform). The server computing device may process the user's context (e.g., according to a set of rules and/or using entity extraction) to generate a notification, which may be provided to the user's computing device for presentation to the user accordingly.

For example, a user may access a travel website using the web browser application, which may have a set of associated triggers. Context information associated with the user's context may be provided to the notification platform, which may process the context information to generate a temporally relevant notification for the user. For example, the notification may comprise a weather forecast or other travel information associated with a location to which the user is considering traveling (as indicated by the loaded webpage). The notification may then be provided to the user's computing device, thereby causing the user's computing device to present the notification to the user. The user may actuate the notification to view additional information associated with the weather forecast or other travel information. As another example, the user may instead dismiss or snooze the notification according to aspects described herein.

Thus, the user's computing device may make an initial determination as to whether a trigger is available based on the user's context, such that the server computing device may make a subsequent determination whether a notification is triggered, such that the notification is generated and provided to the user's computing device for presentation. As a result of performing aspects of the notification trigger processing at the notification platform, it may be possible to update notifications and associated contexts more quickly than if notification processing was instead performed primarily at the user's computing device. Even so, it will be appreciated that, in other examples, such processing may be performed substantially or entirely locally to the user's computing device rather than by the notification platform, or vice versa.

In another example, a notification may be generated when a user is redirected from one application, extension, service, or website to another application, extension, service, or website, among other examples. For example, if a user is redirected from an application to a website, a notification may be generated to indicate to the user that the web browser application has been opened as a result of a user interaction in the application from which the user was redirected, thereby improving continuity in such scenarios.

As a further example, a notification may be generated based on an indication that is received by the user's computing device, as may be the case when the device receives a push notification (e.g., from the notification platform or from a third-party application or service). Thus, it will be appreciated that aspects described herein may provide a central framework with which to present notifications, thereby offering a consistent user experience within an application, among a group of applications, and/or throughout an operating system, among other examples.

FIG. 1 illustrates an overview of an example system 100 for notification delay and auto-dismiss functionality according to aspects described herein. As illustrated, system 100 includes notification platform 102, computing device 104, and network 106. Notification platform 102 and computing device 104 are illustrated as communicating via network 106, which may comprise a local area network, a wireless network, or the Internet, or any combination thereof, among other examples.

Computing device 104 may be any of a variety of devices, including, but not limited to, a mobile computing device, a tablet computing device, a laptop computing device, a desktop computing device, a server computing device, or an IoT computing device. As illustrated, computing device 104 includes application 114, notification manager 116, and context engine 118. Application 114 may be any of a variety of software that executes on computing device 104, including first-party software (e.g., as may be part of or provided with an operating system of computing device 104) and third-party software, among other examples.

As an example, application 114 may be a productivity application (e.g., a word processing application, a presentation application, and/or a spreadsheet application) or a web browser application. Application 114 may include one or more plugins, add-ons, or extensions that further extend the capabilities of application 114 (e.g., as may be provided by the developer of application 114 and/or by one or more third-parties). While examples are described with respect to application 114, it will be appreciated that similar techniques may be applied by an operating system or other piece of software executing on computing device 104 in other examples.

Notification manager 116 may manage the generation and presentation of notifications according to aspects described herein. Context engine 118 may maintain a context for computing device 104, which may include information associated with application 114 (e.g., content that is displayed by application 114, such as a webpage or website that is accessed by application 114). The context may additionally or alternatively include information associated with computing device 104, such as a geographical location of the computing device or a location at which the computing device is being used (e.g., whether the device is at work or at home). It will be appreciated that the context may include any of a variety of additional or alternative information according to aspects described herein.

Notification manager 116 may determine that the context managed by context engine 118 has one or more associated triggers. For example, notification manager 116 may make such a determination based on trigger information provided by notification platform 102. The trigger information may include a list of websites, applications, and/or services for which one or more triggers are available or may include a regular expression, pattern, or other information that may be used for matching, among other examples. If notification manager 116 determines there is a trigger associated with the context of computing device 104, notification manager 116 may provide context information to notification platform 102 accordingly.

As illustrated, notification platform 102 includes context processor 108, notification engine 110, and trigger manager 112. In examples, context processor 108 processes context information, as may be received from computing device 104. As discussed above, context processor 108 may process context information received from a computing device according to one or more triggers (e.g., which may have an associated set of rules and/or may comprise performing entity extraction). For example, a trigger may be identified for a given context based on an association with an application, extension, service, URL, or path indicated by the context information, among other examples.

As such, if context processor 108 determines to generate a notification, notification engine 110 may process the context information based on the trigger to generate the notification accordingly. In examples, notification engine 110 generates the notification based on content indicated by the context information, based on content indicated by the trigger, and/or based on content from any of a variety of other data sources (not pictured). Returning to the above example for a travel website, notification engine 110 may obtain weather data from a remote data source, which may be included in the notification in combination with content from the context information. Notification engine 110 may then provide the generated notification to computing device 104 for display to a user.

Notification manager 116 thus receives the notification from notification engine 110, such that notification manager 116 may generate and present a notification to the user according to aspects described herein. In some examples, notification manager 116 may determine whether to display the notification to the user, such that the notification may not be displayed if the context has changed, if the user has already received another notification within a predetermined amount of time, or if the user has snoozed such notifications, among other examples.

In examples, the notification is displayed in association with an application icon, extension icon, service icon, website icon, or other icon for which it was generated. For example, if the notification is associated with an extension of application 114, the notification may be displayed near an icon for the extension. The notification may include a snooze UI control and a dismiss UI control. In examples, actuation of the notification (e.g., based on mouse input, keyboard input, touch input, physical control input) may cause additional content to be displayed that is associated with the notification and/or may cause a different application to be opened, among other examples. Additional examples of such aspects are discussed below with respect to FIGS. 5A-5G.

Notification manager 116 may generate telemetry data for user interaction with the generated notification, for example, indicating if the notification is actuated, if the notification is permitted automatically disappear (e.g., as a result of an auto-dismiss timer expiring), if the notification is manually dismissed (e.g., via the dismiss UI control), or if the notification is snoozed (e.g., via the snooze UI control).

The telemetry data may be provided to trigger manager 112, which may thus be used to modify or delete an existing trigger and/or to generate a new trigger, among other examples. In some instances, a set of triggers may be tuned for a given user or group of users or for a given application, extension, service, or website. For example, a machine learning (ML) model may be trained, retrained, and/or fine-tuned based on such aggregated telemetry data, where a goal of the ML model is to increase the likelihood of actuation of the notification and/or to reduce the likelihood of manual and/or automatic dismissal of the notification associated with a given trigger.

While example processing is described with respect to notification platform 102 and computing device 104, it will be appreciated that similar aspects may be distributed according to any of a variety of other paradigms or may be performed substantially locally or substantially remotely from computing device 104 in other examples. Further, it will be appreciated that any of a variety of other trigger processing and/or telemetry data processing techniques may be used in other examples.

Figure 2:
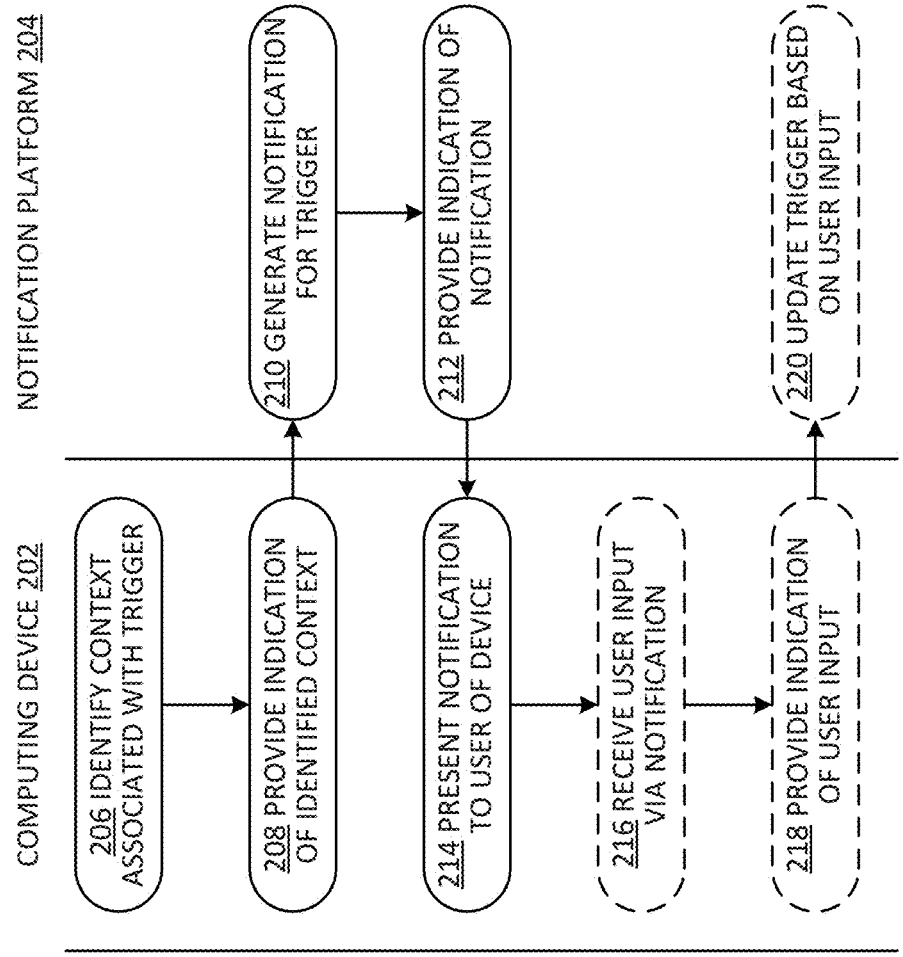
FIG. 2 illustrates an overview of an example process flow between a computing device and a notification platform according to aspects described herein.

FIG. 2 illustrates an overview of an example process flow 200 between computing device 202 and notification platform 204 according to aspects described herein. Aspects of computing device 202 and notification platform 204 are similar to those discussed above with respect to computing device 104 and notification platform 102, respectively, and are therefore not redescribed below in detail.

Flow 200 begins at operation 206, where a context associated with a trigger is identified. For example, the context may have been generated or otherwise managed by a context engine, such as context engine 118 in FIG. 1. Operation 206 may comprise evaluating a list of applications, extensions, services, or websites for which one or more triggers exist. As another example, operation 206 may comprise evaluating one or more regular expressions or other patterns associated with a set of triggers.

Thus, it will be appreciated that any of a variety of techniques may be used to determine that the current context is associated with one or more triggers. Operation 206 may be performed to reduce the amount of processing and/or associated traffic between computing device 202 and notification platform 204. Even so, in some examples, operation 206 may be omitted, as may be the case when most or all subsequent processing is performed locally to computing device 202 or when the context of computing device 202 is not expected to change at a high frequency, among other examples.

At operation 208, an indication of the identified context is provided to notification platform 204. For example, the indication may comprise at least a part of content that is presented to a user (e.g., via an application similar to application 114 in FIG. 1), an indication of a web site and/or document (e.g., a URL or a file path), and/or a location for computing device 202, among other examples.

Accordingly, at operation 210, notification platform 204 generates a notification based on a trigger with which the context information is associated. As noted above, generating the notification may comprise evaluating a set of associated rules and/or performing entity extraction. While examples are described in which a single notification is generated for a single trigger, it will be appreciated that, in other examples, multiple triggers may be processed and that each trigger may generate one notification, multiple notifications, or no notifications. Operation 210 may comprise generating the content of the notification which, as noted above, may include content from the context information what was received from computing device 202, content from notification platform 204, and/or content from any of a variety of other sources (not pictured).

At operation 212, notification platform 204 provides an indication of the notification accordingly. In examples, the indication comprises notification content and an indication of an application, extension, service, or website with which the notification is associated. Flow progresses to operation 214, where the notification is displayed at computing device 202 according to aspects described herein.

Operations 216-220 are illustrated using dashed lines to indicate that, in some examples, they may not be performed (such that flow 200 terminates at operation 214, 216, or 220). For example, once the notification is presented at operation 214, user interaction associated with the notification may not be received, such that the notification may disappear after the expiration of an auto-dismiss threshold.

By contrast, if user interaction is received, flow progresses to operation 216. Example user interactions include, but are not limited to, actuation of the notification or an associated UI control, as well as a hover or mouseover event. It will be appreciated that a gesture or other user input may be identified as such a user interaction with the notification, such as determining that the user is looking at the notification via gaze detection. Accordingly, if user interaction with the notification is identified, the auto-dismiss timer may be paused (e.g., in the event of a hover, mouseover, or other interaction) or cancelled (e.g., in the event of actuation of the notification or an associated UI control). Additional examples of such user interactions and associated processing are described herein.

Flow may progress to operation 218, where an indication of the user interaction is provided (e.g., as telemetry data to a trigger manager, such as trigger manager 112 in FIG. 1). Accordingly, notification platform 204 may update an associated trigger based on the telemetry data at operation 220, where flow 200 terminates.

Figure 3:
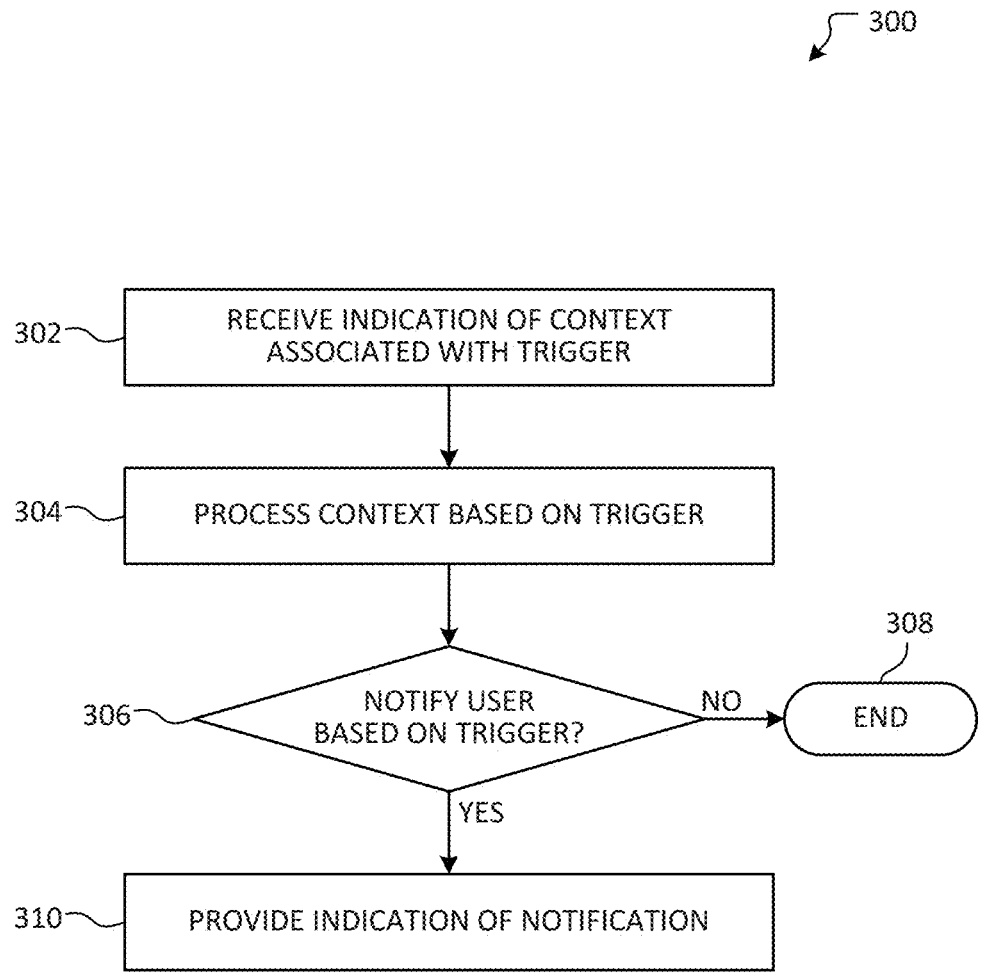
FIG. 3 illustrates an overview of an example method for generating a notification for a context based on a trigger.

FIG. 3 illustrates an overview of an example method 300 for generating a notification for a context based on a trigger. In examples, aspects of method 300 are performed by a notification platform, such as notification platform 102 or 204 in FIGS. 1 and 2, respectively.

Method 300 begins at operation 302, where an indication of a context associated with a trigger is received. For example, the indication may be received from a notification manager (e.g., notification manager 116 in FIG. 1) based on a context generated by a context engine (e.g., context engine 118).

Accordingly, at operation 304, the context is processed based on an associated trigger. In examples, operation 304 comprises identifying a trigger with which to process the context indication, as may be determined by a URL, a file path, and/or another indication of an application, extension, service, or website with which the context is associated. In examples, the trigger is identified from a set of triggers associated with the user, a group of users, and/or a region, among other examples. As noted above, processing the context may comprise evaluating a set of rules associated with the trigger and/or performing entity extraction, among other examples. Operation 304 may comprise generating content for the notification according to aspects described herein.

At determination 306, it is determined whether to notify the user based on the trigger. For example, the set of rules evaluated at operation 304 may comprise a determination as to whether the notification is relevant (e.g., above a predetermined threshold) to content indicated by the context information. As another example, determination 306 may comprise determining whether a similar notification (e.g., associated with similar content and/or a similar application, extension, service, or website) has been provided to the computing device within a predetermined time range or whether notifications have been snoozed. Thus, it will be appreciated that any of a variety of determinations may be made at determination 306. If it is determined not to notify the user based on the trigger, flow branches "NO" and ends at operation 308.

By contrast, if it is instead determined to notify the user, method 300 branches "YES" to operation 310, where an indication of the notification is provided. For example, the indication may comprise notification content that was generated at operation 304 and/or an indication of an application, extension, service, or website with which the notification is associated. The indication may be provided in response to the context indication that was received at operation 302 or may be provided using any of a variety of other mechanisms (e.g., as a push notification). Method 300 terminates at operation 310.

Figure 4:
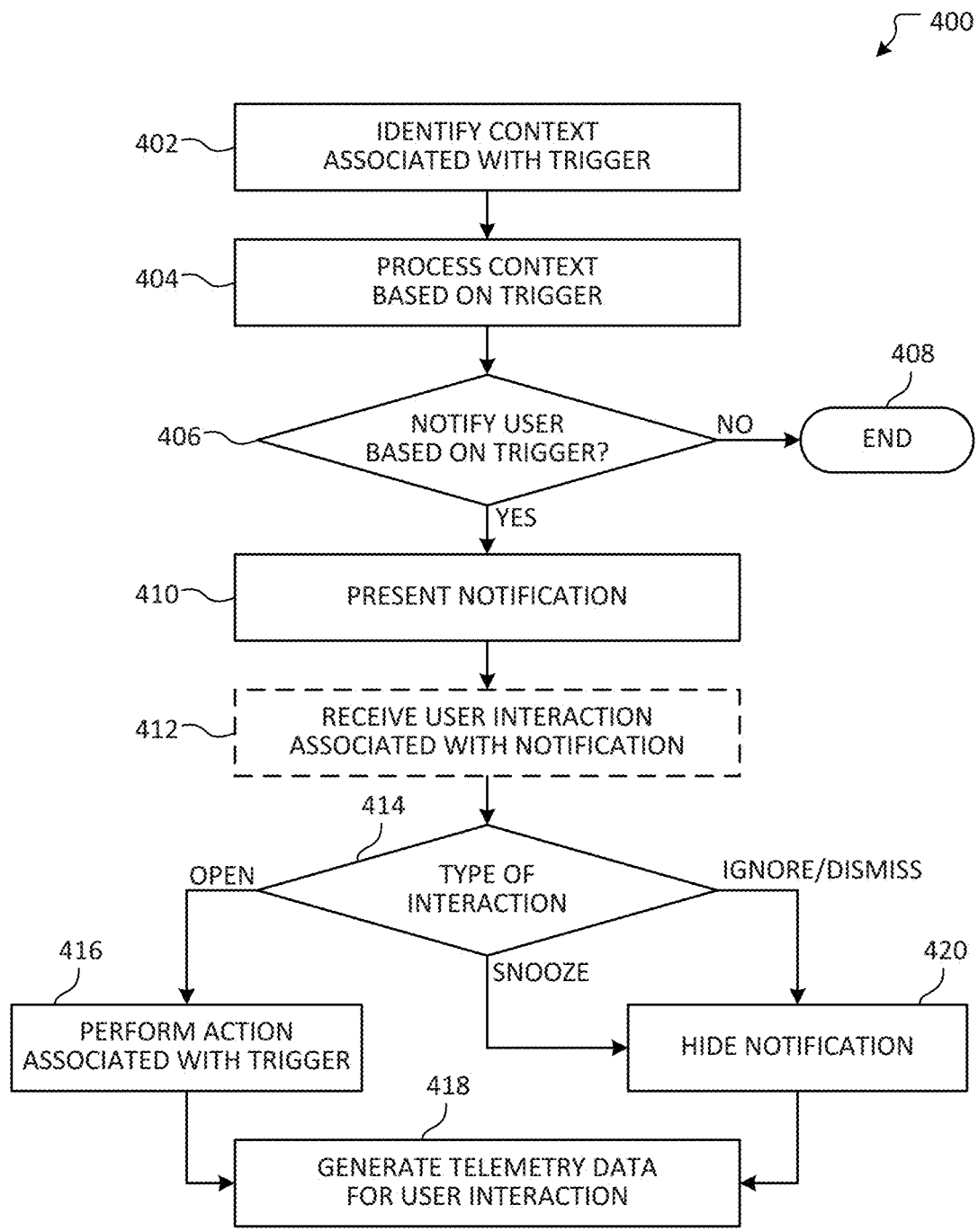
FIG. 4 illustrates an overview of an example method for presenting a notification for a context according to aspects described herein.

FIG. 4 illustrates an overview of an example method 400 for presenting a notification for a context according to aspects described herein. In examples, aspects of method 400 are performed by a computing device, such as computing device 104 or computing device 202 in FIGS. 1 and 2, respectively.

Method 400 begins at operation 402, where a context associated with a trigger is identified. For example, the context may have been generated or otherwise managed by a context engine, such as context engine 118 in FIG. 1. Operation 402 may comprise evaluating a list of applications, services, or websites for which one or more triggers exist. As another example, operation 402 may comprise evaluating one or more regular expressions or other patterns associated with a set of triggers. It will thus be appreciated that any of a variety of techniques may be used to determine whether a trigger exists for a given context.

At operation 404, the context is processed based on the trigger. In examples, operation 404 comprises providing a context indication to a notification platform (e.g., notification platform 102 or notification platform 204 in FIGS. 1 and 2, respectively), such that the notification platform may process the context indication according to aspects discussed above with respect to method 300 in FIG. 3. In other examples, similar processing may be performed local to the computing device, such that operation 404 comprises performing aspects similar to those discussed above with respect to method 300. Such aspects are therefore not redescribed in detail.

Method 400 progresses to determination 406, where a determination is made whether to notify the user based on the trigger. In examples, determination 406 comprises evaluating the relevance of the notification (e.g., as was discussed above with respect to determination 306 in FIG. 3) and/or historical notification activity at the computing device. For example, if the number of previous notifications within a predetermined time period exceeds a predetermined threshold, it may be determined not to notify the user. As a further example, determination 406 may comprise evaluating an amount of time that elapsed between operation 402 and 404 and/or whether the context at the computing device has changed, as the notification may no longer be temporally relevant to the user's current task at hand. In another example, the determination may comprise determining whether such notifications have been snoozed. Thus, it will be appreciated that any of a variety of determinations may be made at determination 406. If it is determined not to notify the user, flow branches "NO" and ends at operation 408.

By contrast, if it is instead determined to notify the user, flow branches "YES" to operation 410, where the notification is presented to the user. For example, the notification may be displayed in association with an application icon, extension icon, service icon, website icon, or other icon for which it was generated (e.g., as may have been determined based on the trigger with which the context was processed). The notification may include a snooze UI control and a dismiss UI control. Additional examples of such aspects are discussed below with respect to FIGS. 5A-5G.

Flow may progress to operation 412, where user interaction associated with the notification is received. As discussed above, the user may mouseover, actuate, or otherwise interact with the notification and/or one or more UI controls therein. In other examples, no user interaction may be received specifically in association with the notification, such that method 400 continues from operation 410 to determination 414. In instances where a mouseover event or other similar interaction is identified (e.g., other than an actuation of the notification or associated UI controls), an auto-dismiss timer may be paused. The auto-dismiss timer may remain paused until the user interaction ceases or, as another example, if a cursor associated with the mouseover event does not move for a predetermined amount of time.

At determination 414, a type of interaction is determined. In instances where the user actuated the notification, method 400 branches "OPEN" to operation 416, where an action associated with the trigger is performed. For example, operation 416 may comprise opening an application associated with the notification, opening a side pane associated with an extension for which the notification was generated, and/or opening a website associated with the notification, among other examples. In some instances, the action that is performed at operation 416 may be user-configurable.

Flow progresses to operation 418, where telemetry data is generated based on the user interaction, which may be provided to a notification platform as described above, thereby enabling triggers with which context information is processed to be added, updated, and/or removed, among other examples. Method 400 terminates at operation 418.

Returning to determination 414, if the user interaction is instead actuation of a snooze UI control, flow branches "SNOOZE" to operation 420, where the notification is hidden. In the instance where the snooze UI control is actuated, operation 420 may comprise scheduling the notification to reappear at a later date, time, and/or after the occurrence of the event (e.g., after the computing device is restarted or once the computing device exhibits the same or a similar context, as may be the case when the user returns to a given website). In examples, operation 420 additionally or alternatively affects subsequent determinations as to whether a notification should be presented (e.g., determination 406), as may be the case when a user snoozes notifications associated with an application, extension, service, or website, among other examples. Method 400 then progresses to operation 418 as discussed above, after which method 400 terminates.

Returning again to determination 414, if the user interaction includes actuation of a dismiss UI control or no user interaction is received such that the auto-dismiss timer expires, flow branches "IGNORE/DISMISS" to operation 420, where the notification is hidden. In contrast to the above-described aspects, if operation 420 is performed as a result of branching "IGNORE/DISMISS," the notification may not be scheduled for later presentation. In examples where a dismiss UI control is actuated, the notification may not be added to a notification tray or notification center, while expiration of the auto-dismiss timer may result in adding the notification to a notification tray or notification center for later access by the user. Method 400 then progresses to operation 418 as discussed above, after which method 400 terminates.

Figure 5A:
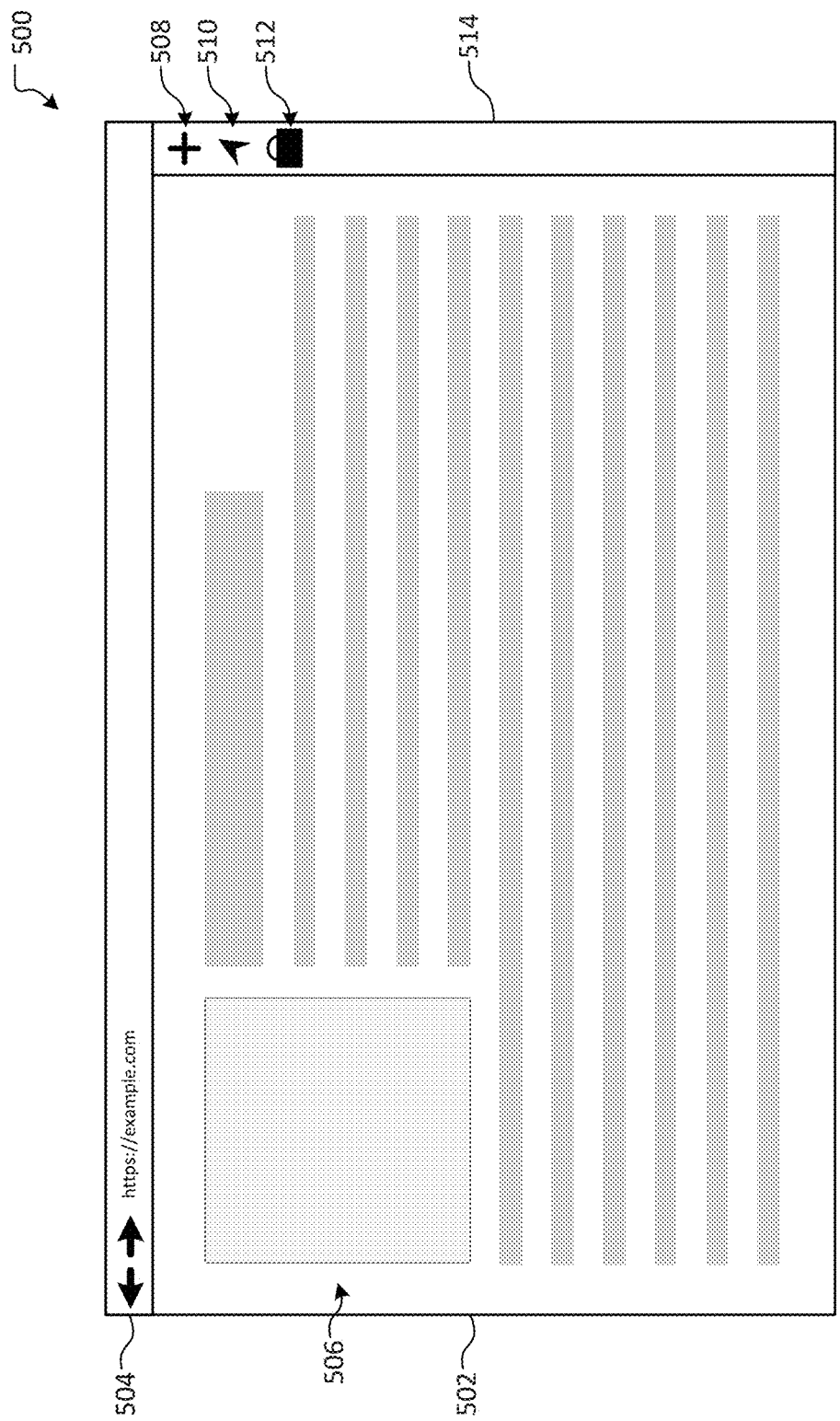
FIGS. 5A-5G illustrate overviews of example user interface aspects with which a notification may be presented to a user according to aspects described herein.

FIGS. 5A-5G illustrate overviews of example user interface aspects with which a notification may be presented to a user according to aspects described herein. As illustrated in FIG. 5A, UI 500 is provided as an example UI for an application (e.g., application 114 in FIG. 1). More specifically, UI 500 illustrates an example web browser application in which content 506 is displayed in document pane 502, which is associated with "http://example.com" as indicated in control bar 504. UI 500 further comprises sidebar 514, in which extension icons 508, 510, and 512 are present. In examples, the extensions in sidebar 514 are user-configurable, such that the user may add, remove, and/or rearrange extension icons 508, 510, and 512, among other examples.

It will be appreciated that UI 500 and the associated UI elements (e.g., control bar 504, document pane 502, and sidebar 514) are provided in an example configuration and, in other examples, any of a variety of other configurations and constituent UI elements may be used. For example, UI 500 may be associated with any of a variety of other applications.

Figure 5B:
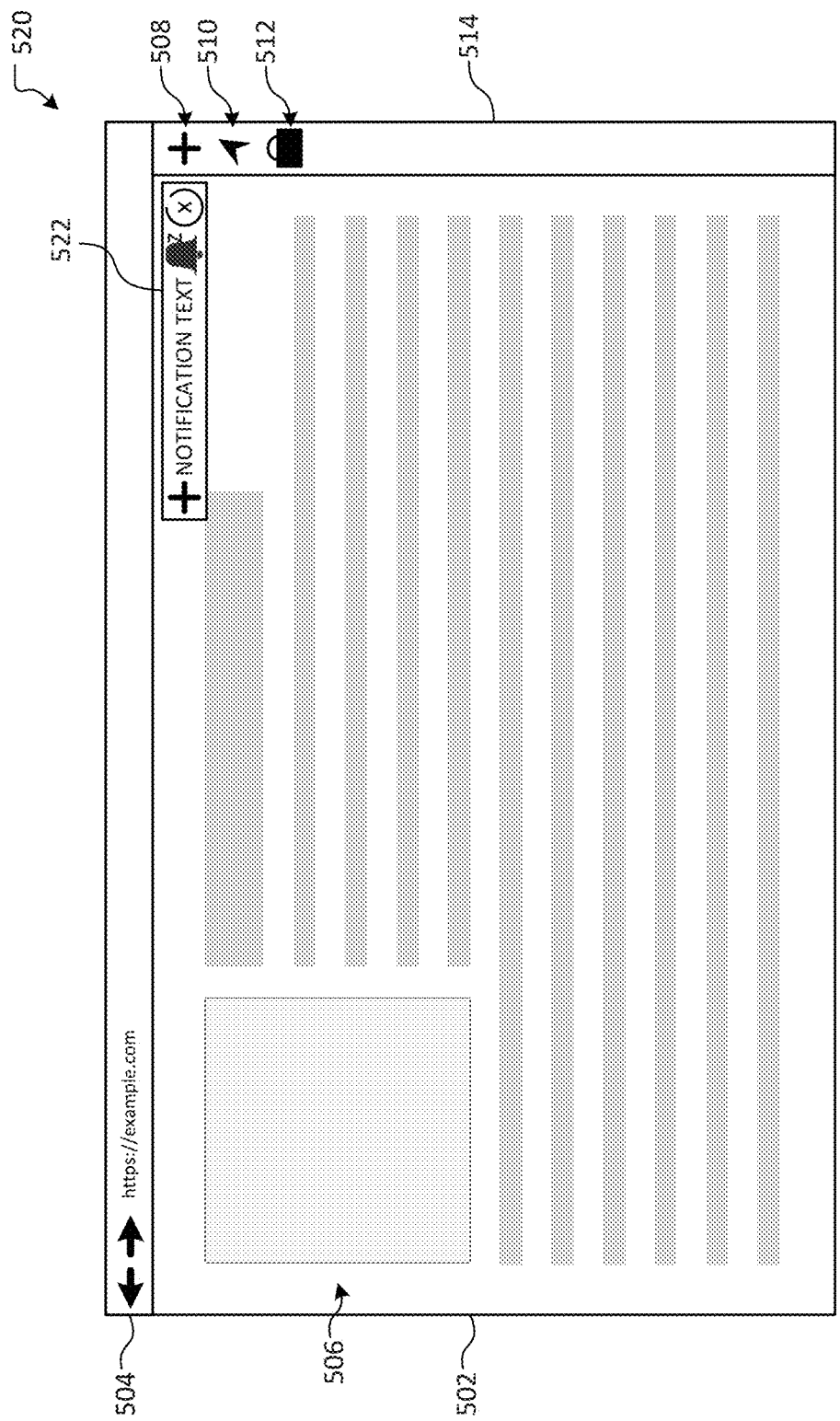

With reference now to FIG. 5B, UI 520 is provided as an example in which notification 522 is presented. As illustrated, notification 522 is presented in association with extension icon 508, as the notification may have been determined to be generated for a trigger associated with an extension corresponding to extension icon 508 according to aspects described herein. Notification 522 may be referred to as a "flyout," as it may appear to extend from extension icon 508. In other examples, notification 522 may fade in and fade out in proximity to extension icon 508. It will thus be appreciated that any of a variety of techniques and/or associated animations may be used to present and/or hide notification 522.

Figure 5C:
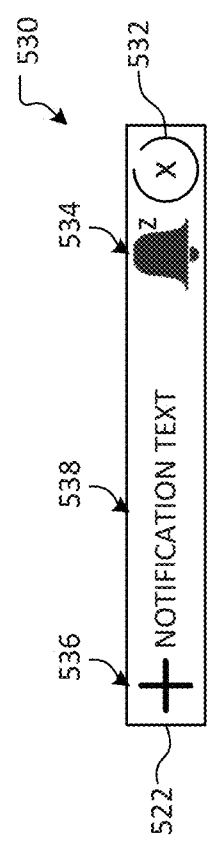

Turning to FIG. 5C, view 530 provides an enlarged view of notification 522, which, as illustrated, includes notification icon 536, notification content 538, snooze UI control 534, and dismiss UI control 532. It will be appreciated that notification 522 is provided as an example and, in other examples, any of a variety of different configurations and associated elements may be used. For example, the appearance of notification 522 may depend on whether the computing device is in a "dark mode" or a "light mode" configuration. As another example, notification 522 may be presented in a vertical configuration rather than the illustrated horizontal configuration.

As illustrated, notification icon 536 is similar to extension icon 508, thereby providing visual continuity to the user to indicate that notification 522 is associated with the extension for which extension icon 508 is displayed. In other examples, notification icon 536 may be an icon different from extension icon 508 but that still indicates an association with the extension (e.g., as may be obtained from a set of assets associated with the extension). Notification content 538 may be generated according to aspects described herein. While notification content 538 is illustrated as comprising "NOTIFICATION TEXT," it will be appreciated that any of a variety of content types may be notification content, including, but not limited to, text content, image content, and/or video content. In examples, notification 522 may further have associated audio content that is played contemporaneously with the display of notification 522.

When actuated, snooze UI control 534 may snooze notification 522 for later display to the user or may present a snooze menu according to aspects described herein. An example snooze menu is described below with respect to FIG. 5F. When actuated, dismiss UI control 532 may cause notification 522 to be dismissed according to aspects described herein. Dismiss UI control 532 includes a visual indication associated with an auto-dismiss timer, which may provide a visual countdown until notification 522 is automatically dismissed. While the illustrated visual indication is a part circle (e.g., which progresses from a full circle, to a part circle, to an empty circle), it will be appreciated that any of a variety of alternative visual indications may be provided, including, but not limited to, a progress bar and/or a numerical indication (e.g., that there are x seconds remaining). As another example, the visual indication may affect notification 522 itself, such that notification 522 may initially be presented as fully opaque and may fade until disappearing once the auto-dismiss timer has expired.

Figure 5D:
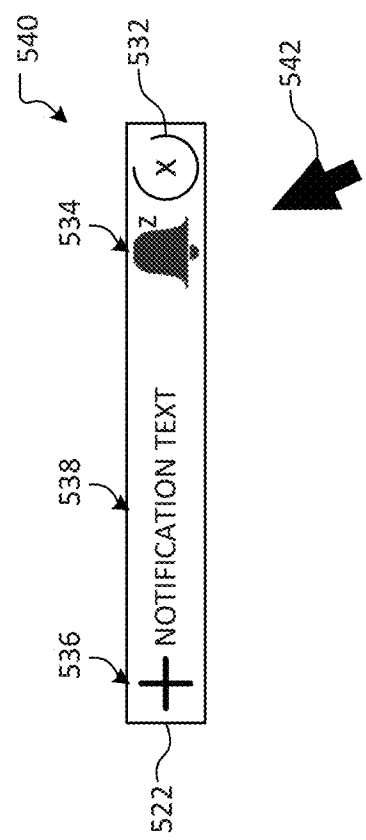
Figure 5E:
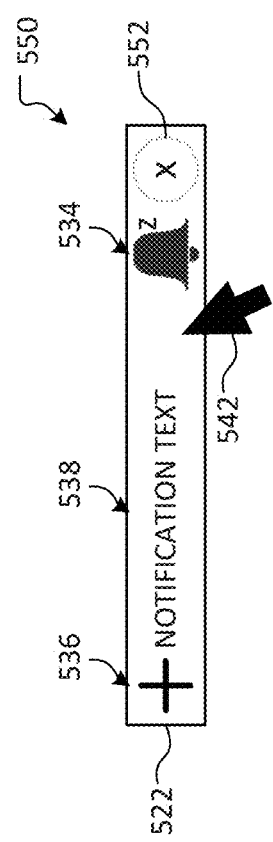

FIGS. 5D and 5E are provided as an example in which a mouseover event is received by notification 522, though it will be appreciated that similar techniques may be used for any of a variety of similar user interactions (e.g., a user hovering over a touch interface or detecting a user gaze toward notification 522). View 540 illustrates an example in which cursor 542 is near, but not over, notification 522. As compared to FIG. 5C, dismiss UI control 532 depicts a reduced amount of time remaining, as a result of continued progression by the auto-dismiss timer. By contrast, FIG. 5E illustrates an example view 550 in which cursor 542 is over notification 522, thereby pausing the auto-dismiss timer accordingly. As a result, dismiss UI control 552 instead displays a greyed out circle to indicate that the timer is paused. It will be appreciated that any of a variety of additional or alternative indications may be provided to indicate that the timer is paused, such as a breathing or pulsing animation of dismiss UI control 532 (thereby illustrating the current state of the auto-dismiss timer).

Figure 5F:
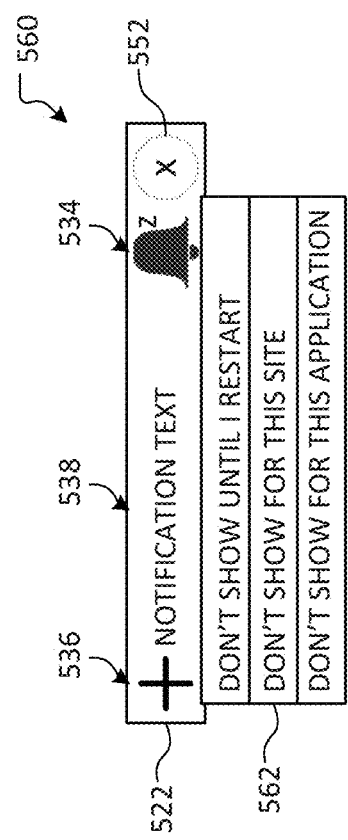

View 560 of FIG. 5F illustrates a first example in which snooze UI control 534 has been actuated, such that snooze menu 562 is presented to the user. As illustrated, three options are presented: snoozing the notification until the device is restarted, snoozing notifications for the current website, and snoozing notifications for the current application. Thus, it will be appreciated that snoozing a notification may affect the notification itself (e.g., notification 522) and/or future notifications that would otherwise be presented (e.g., as may thus not be displayed as a result of determination 406 discussed above with respect to method 400 in FIG. 4). Example options are presented and, in other examples, additional, fewer, or alternative options may be presented. For example, such options may be user-configurable.

Figure 5G:
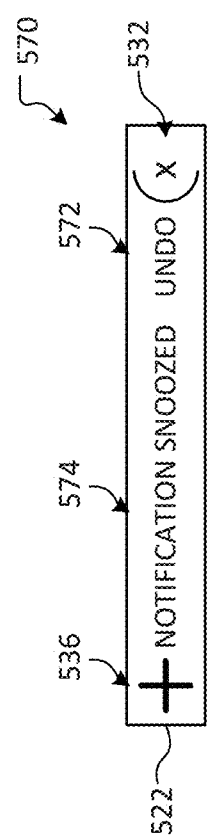

Turning to FIG. 5G, view 570 illustrates an example in which a user interaction to snooze the notification has been received. For example, the user interaction may have been actuation of snooze UI control 534 and/or selection of an option from snooze menu 562. As a result, snooze UI control 534 has been replaced with undo UI control 572 and notification content 538 has been replaced with snooze indication 574. Thus, it is evident to the user from notification 522 that the notification has been snoozed. The user may actuate undo UI control 572 to indicate that the notification and/or subsequent notifications should not be snoozed, such that the notification would be returned to a view similar to that of FIG. 5C, at which point the user could actuate the notification or one of the associated UI controls. If the user does not actuate any of the UI controls, notification 522 would be dismissed according to aspects described herein, as indicated by dismiss UI control 532.

Figure 6:
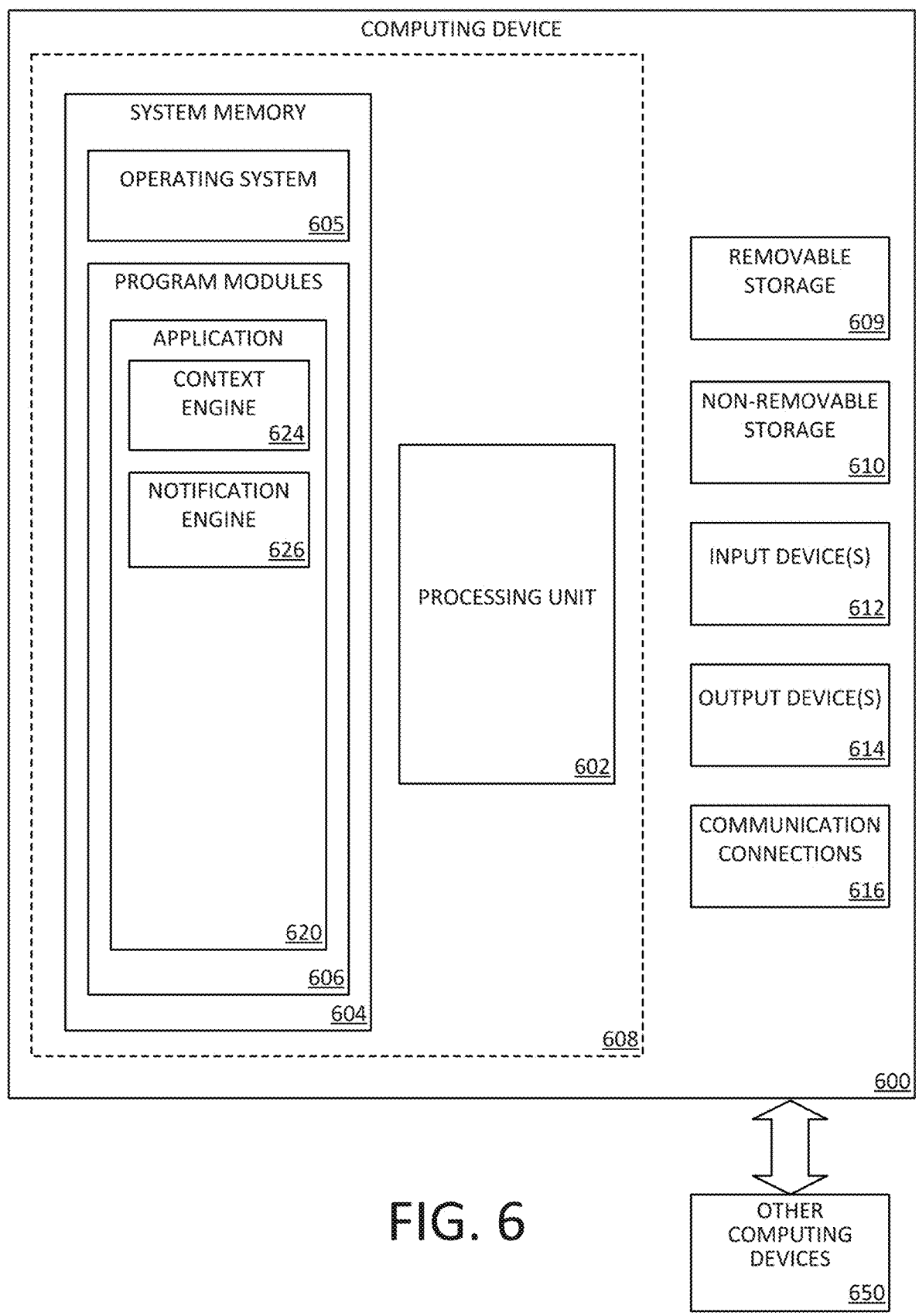
FIG. 6 is a block diagram illustrating example physical components of a computing device with which aspects of the disclosure may be practiced.
Figure 7A:
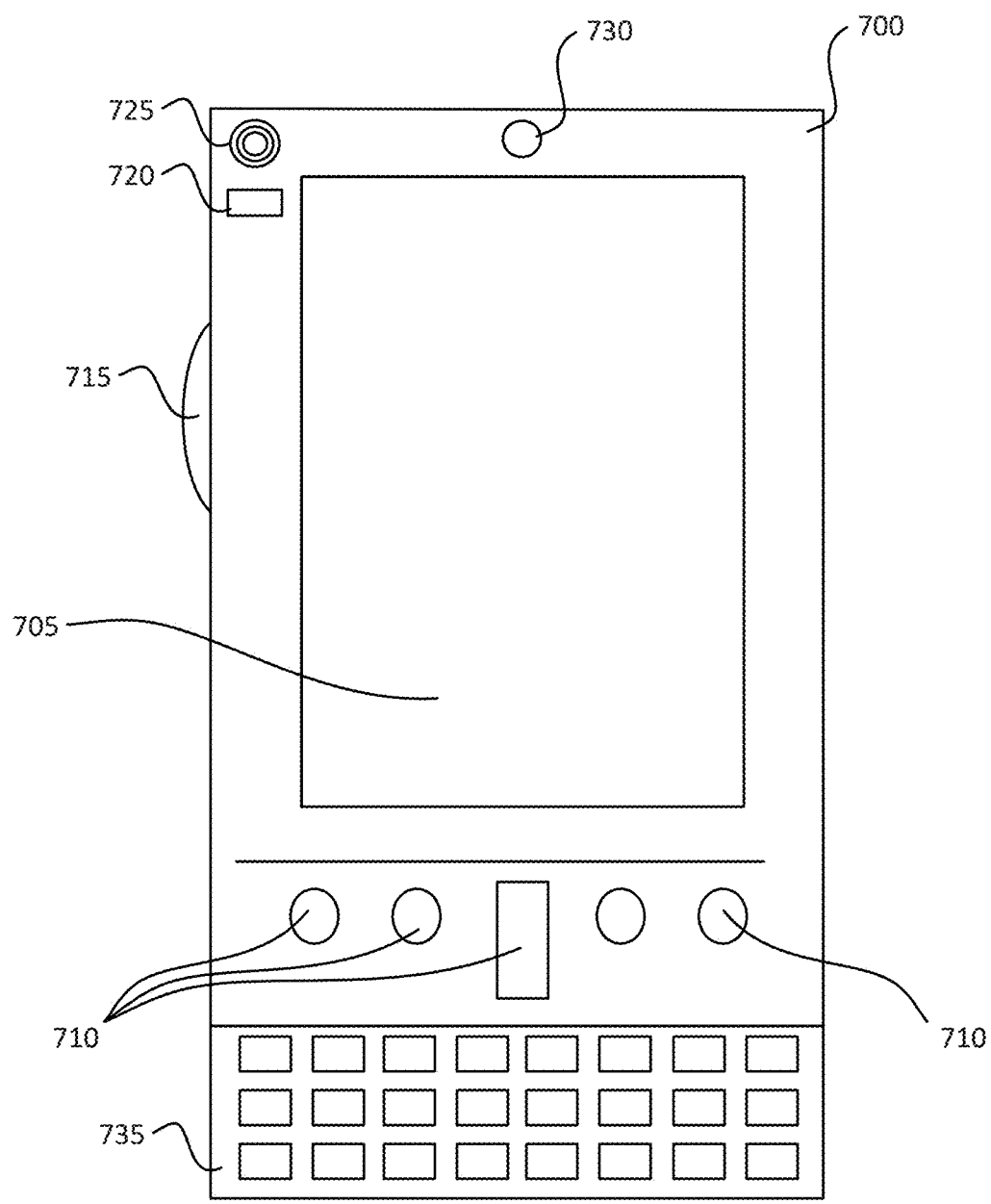
FIGS. 7A and 7B are simplified block diagrams of a mobile computing device with which aspects of the present disclosure may be practiced.
Figure 7B:
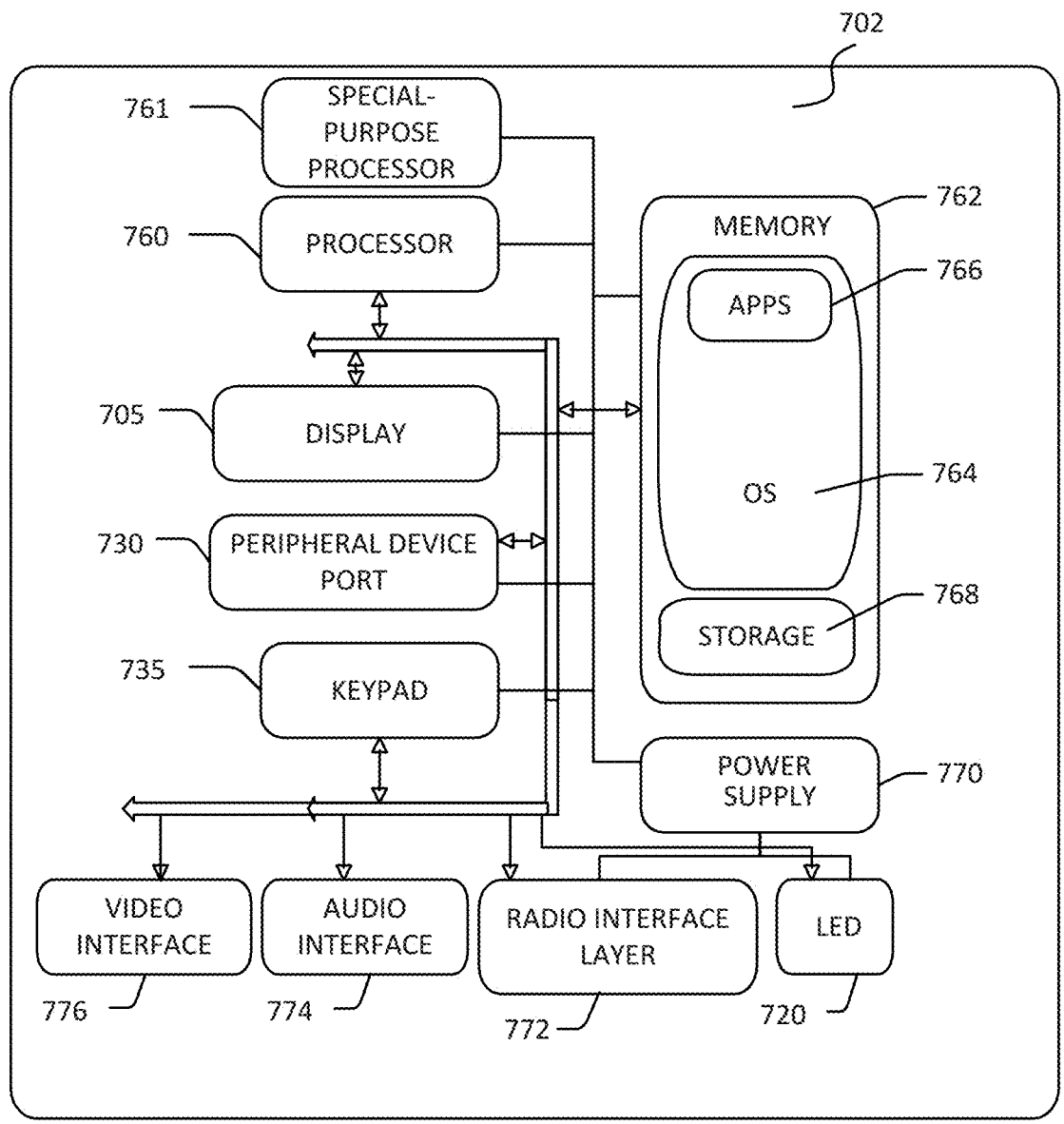
Figure 8:
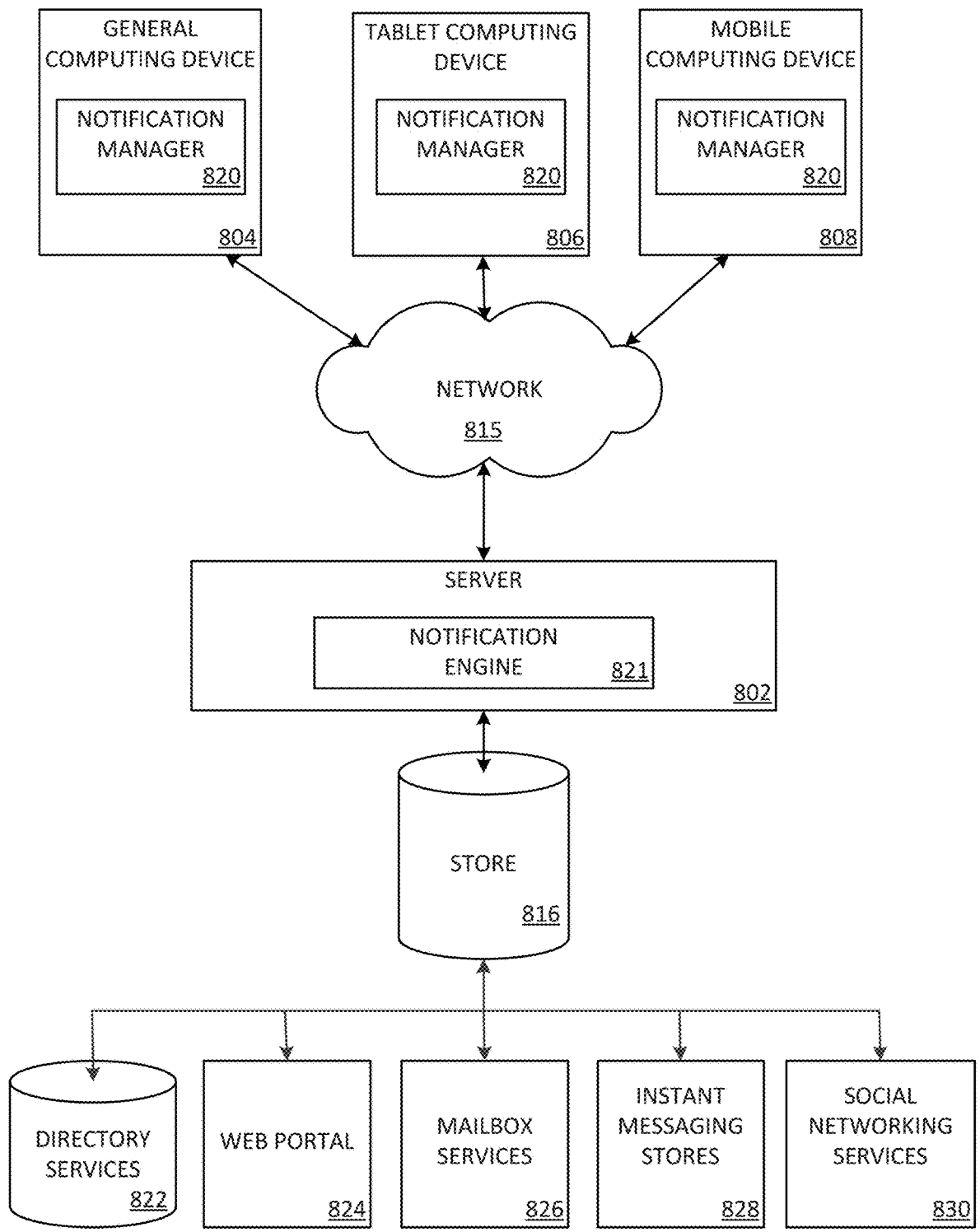
FIG. 8 is a simplified block diagram of a distributed computing system in which aspects of the present disclosure may be practiced.

FIGS. 6-8 and the associated descriptions provide a discussion of a variety of operating environments in which aspects of the disclosure may be practiced. However, the devices and systems illustrated and discussed with respect to FIGS. 6-8 are for purposes of example and illustration and are not limiting of a vast number of computing device configurations that may be utilized for practicing aspects of the disclosure, described herein.

FIG. 6 is a block diagram illustrating physical components (e.g., hardware) of a computing device 600 with which aspects of the disclosure may be practiced. The computing device components described below may be suitable for the computing devices described above, including devices 102 and 104 in FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store context engine 624 and notification engine 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., a sustainability manager, a software telemetry engine, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

A notification manager 820 may be employed by a client that communicates with server device 802, and/or notification engine 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

In other examples, a tablet computing device may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: determining, based on a context for the system, to generate a notification; displaying the notification in association with a user interface element for which the notification was generated, wherein the notification comprises notification content and a dismiss user interface (UI) control that comprises a visual indication of an auto-dismiss timer for the notification; receiving a user interaction associated with the notification; and updating the dismiss UI control to indicate that the auto-dismiss timer for the notification is paused. In an example, determining to generate the notification comprises: evaluating the context based on trigger information associated with a notification platform; based on determining the context is associated with a trigger of the trigger information, providing an indication of the context to the notification platform; and receiving, from the notification platform, an indication of the notification for display to a user of the system. In another example, determining to generate the notification comprises receiving, by the system, and indication of a push notification. In a further example, the user interaction is one of actuation of the notification or actuation of the dismiss UI control; and the set of operations further comprises: when the user interaction is actuation of the notification, performing an action associated with the notification; and when the user interaction is actuation of the dismiss UI control, canceling the auto-dismiss timer and hiding the notification. In yet another example, the notification further comprises a snooze UI control. In a further still example, the user interaction is actuation of the snooze UI control and the set of operations further comprises: in response to actuation of the snooze UI control, snoozing at least one of the notification and a future notification. In an example, the notification further comprises a notification icon associated with the user interface element for which the notification was generated.

In another aspect, the technology relates to a method. The method comprises: displaying a notification in association with a user interface element for which the notification was generated, wherein the notification comprises: notification content; a notification icon associated with a user interface element for which the notification was generated; a snooze UI control; and a dismiss user interface (UI) control that comprises a visual indication of an auto-dismiss timer for the notification; receiving a user interaction associated with the notification; and in response to receiving the user interaction with the notification: pausing the auto-dismiss timer for the notification; and updating the dismiss UI control to indicate that the auto-dismiss timer for the notification is paused. In an example, the notification is displayed in response to receiving, from a remote computing device, an indication to display the notification. In another example, the notification is displayed in response to determining, based on a context for a computing device, to generate the notification. In a further example, the user interaction comprises actuation of the notification and the method further comprises performing an action associated with the notification. In yet another example, the user interaction comprises actuation of the snooze UI control and the method further comprises snoozing at least one of the notification and a future notification. In a further still example, the user interaction comprises actuation of the dismiss UI control and the method further comprises canceling the auto-dismiss timer and hiding the notification.

In a further aspect, the technology relates to another method. The method comprises: determining, based on a context for a computing device, to generate a notification; displaying the notification in association with a user interface element for which the notification was generated, wherein the notification comprises notification content and a dismiss user interface (UI) control that comprises a visual indication of an auto-dismiss timer for the notification; receiving a user interaction associated with the notification; and updating the dismiss UI control to indicate that the auto-dismiss timer for the notification is paused. In an example, determining to generate the notification comprises: evaluating the context based on trigger information associated with a notification platform; based on determining the context is associated with a trigger of the trigger information, providing an indication of the context to the notification platform; and receiving, from the notification platform, an indication of the notification for display to a user of the computing device. In another example, determining to generate the notification comprises receiving, by the computing device, and indication of a push notification. In a further example, the user interaction is one of actuation of the notification or actuation of the dismiss UI control; and the method further comprises: when the user interaction is actuation of the notification, performing an action associated with the notification; and when the user interaction is actuation of the dismiss UI control, canceling the auto-dismiss timer and hiding the notification. In yet another example, wherein the notification further comprises a snooze UI control. In a further still example, the user interaction is actuation of the snooze UI control and the method further comprises: in response to actuation of the snooze UI control, snoozing at least one of the notification and a future notification. In another example, the notification further comprises a notification icon associated with the user interface element for which the notification was generated.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
   determining, based on a context for the system, to generate a notification related to a user interface element of a user interface for a software application;
   displaying, via the user interface, the notification in association with the user interface element for which the notification was generated, wherein the notification comprises:
   notification content; and
   a dismiss user interface (UI) control that comprises a visual indication of a countdown until the notification is automatically dismissed, wherein the dismiss UI control is configured to dismiss the displayed notification in response to user actuation of the dismiss UI control;
   receiving, via the user interface, a user interaction associated with the notification; and
   in response to the user actuation, pausing the countdown until the notification is automatically dismissed, the pausing comprising updating the dismiss UI control to comprise a graphical indication that the countdown is paused.

2. The system of claim 1, wherein determining to generate the notification comprises:
   evaluating the context based on trigger information associated with a notification platform;
   based on determining the context is associated with a trigger of the trigger information, providing an indication of the context to the notification platform; and
   receiving, from the notification platform, an indication of the notification for display to a user of the system.

3. The system of claim 1, wherein determining to generate the notification comprises receiving, by the system, and indication of a push notification.

4. The system of claim 1, wherein:
   the user interaction is one of actuation of the notification or actuation of the dismiss UI control; and
   the set of operations further comprises:
   when the user interaction is actuation of the notification, performing an action associated with the notification; and
   when the user interaction is actuation of the dismiss UI control, canceling the countdown and hiding the notification.

5. The system of claim 1, wherein the notification further comprises a snooze UI control.

6. The system of claim 5, wherein the user interaction is actuation of the snooze UI control and the set of operations further comprises:
   in response to actuation of the snooze UI control, snoozing at least one of the notification and a future notification.

7. The system of claim 1, wherein the notification further comprises a notification icon associated with the user interface element for which the notification was generated.

8. A method, comprising:
   displaying, via a user interface for a software application, a notification in association with a user interface element of the user interface for which the notification was generated, wherein the notification comprises:
   notification content;
   a notification icon associated with a user interface element for which the notification was generated;
   a snooze user interface (UI) control; and
   a dismiss user interface control that comprises a visual indication of a countdown until the notification is automatically dismissed, wherein the dismiss user interface control is configured to dismiss the displayed notification in response to user actuation of the dismiss UI control;
   receiving, via the user interface, a user interaction associated with the notification; and
   in response to receiving the user interaction with the notification:
   pausing the auto-dismiss timer for the notification; and
   updating the dismiss UI control to comprise a graphical indication that the countdown until the notification is automatically dismissed is paused.

9. The method of claim 8, wherein the notification is displayed in response to receiving, from a remote computing device, an indication to display the notification.

10. The method of claim 8, wherein the notification is displayed in response to determining, based on a context for a computing device, to generate the notification.

11. The method of claim 8, wherein the user interaction comprises actuation of the notification and the method further comprises performing an action associated the notification.

12. The method of claim 8, wherein the user interaction comprises actuation of the snooze UI control and the method further comprises snoozing at least one of the notification and a future notification.

13. The method of claim 8, wherein the user interaction comprises actuation of the dismiss UI control and the method further comprises canceling the countdown and hiding the notification.

14. A method, comprising:
   determining, based on a context for a computing device, to generate a notification related to a user interface element of a user interface of a software application;
   displaying, via the user interface, the notification in association with the user interface element for which the notification was generated, wherein the notification comprises;
   notification content; and
   a dismiss user interface (UI) control that comprises a visual indication a countdown until the notification is automatically dismissed, wherein the dismiss UI control is configured to dismiss the displayed notification in response to user actuation of the dismiss UI control;
   receiving, via the user interface, a user interaction associated with the notification; and
   in response to the user actuation, pausing the countdown until the notification is automatically dismissed, the pausing comprising updating the dismiss UI control to comprise a graphical indication that the countdown is paused.

15. The method of claim 14, wherein determining to generate the notification comprises:
   evaluating the context based on trigger information associated with a notification platform;
   based on determining the context is associated with a trigger of the trigger information, providing an indication of the context to the notification platform; and receiving, from the notification platform, an indication of the notification for display to a user of the computing device.

16. The method of claim 14, wherein determining to generate the notification comprises receiving, by the computing device, and indication of a push notification.

17. The method of claim 14, wherein:
the user interaction is one of actuation of the notification or actuation of the dismiss UI control; and
the method further comprises:
when the user interaction is actuation of the notification, performing an action associated with the notification; and
when the user interaction is actuation of the dismiss UI control, canceling the countdown and hiding the notification.

18. The method of claim 14, wherein the notification further comprises a snooze UI control.

19. The method of claim 18, wherein the user interaction is actuation of the snooze UI control and the method further comprises:
in response to actuation of the snooze UI control, snoozing at least one of the notification and a future notification.

20. The method of claim 14, wherein the notification further comprises a notification icon associated with the user interface element for which the notification was generated.

* * * * *